United States Patent [19]

Nazarenus

[11] 4,138,200
[45] Feb. 6, 1979

[54] DRILL STOP

[75] Inventor: Carl L. Nazarenus, Woodenville, Wash.

[73] Assignee: Boeing Commercial Airplane Company, Seattle, Wash.

[21] Appl. No.: 874,189

[22] Filed: Feb. 1, 1978

[51] Int. Cl.² .............................................. B23B 47/18
[52] U.S. Cl. ............................... 408/241 S; 408/72 R; 408/112
[58] Field of Search .................... 408/241 S, 200, 199, 408/203, 241 R, 72 R, 112, 88

[56] References Cited

U.S. PATENT DOCUMENTS

| Re. 25,860 | 9/1965 | Elias | 408/112 X |
|---|---|---|---|
| 757,950 | 4/1904 | McElwain et al. | 408/112 X |
| 1,058,149 | 4/1913 | Campbell | 408/112 |
| 2,198,288 | 4/1940 | Leaman | 408/112 |
| 2,210,128 | 8/1940 | Rohr | 408/81 |
| 2,338,765 | 1/1944 | Hartman | 408/81 |
| 2,402,353 | 6/1946 | Trautmann | 408/112 |
| 2,949,618 | 8/1960 | Peyser et al. | 408/112 |

Primary Examiner—Horace M. Culver
Attorney, Agent, or Firm—Bernard A. Donahue; Conrad O. Gardner

[57] ABSTRACT

A drill stop which includes a conically shaped nosepiece facing the drilling surface, the nosepiece having a hole coaxially disposed therein providing a slip fit with the drill diameter. The conically shaped nosepiece retains a coaxially disposed steel spring to soften the shock of drill point breakthrough in drilled material. A bushing sleeve at the end of the steel spring opposite the nosepiece retains the steel spring in position while the end of the bushing sleeve opposite the steel spring-retaining end provides a press fit for one end of a spacer tube, the other end of the spacer tube contacting the drill chuck jaws.

5 Claims, 5 Drawing Figures

DRILL STOP

This invention relates to drill stops and more particularly to drill stops of the type which rotate with the drill.

Various nonrotating devices have heretofore been utilized in drilling, such devices have included drill bushing devices such as shown in U.S. Pat. No. 2,210,128 having a nonrotating drill-guiding bushing including a spring, however, not providing the drill stop function.

It is accordingly an object of this invention to provide a drill stop including spring means for limiting drill travel.

It is a further object of this invention to provide a drill stop having a cylindrically shaped tubular member press fit in a bushing sleeve at one end and secured against chuck jaws at the other end, thereby facilitating removal of the tubular member to accommodate different length drills.

Other objects and advantages of the invention will be more fully understood from a consideration of the following specification taken in conjunction with the accompanying drawings, in which:

FIG. 1 is a side elevational view of a drill bushing device representative of the prior art and corresponding to FIG. 1 of U.S. Pat. No. 2,210,128;

Figure 1:
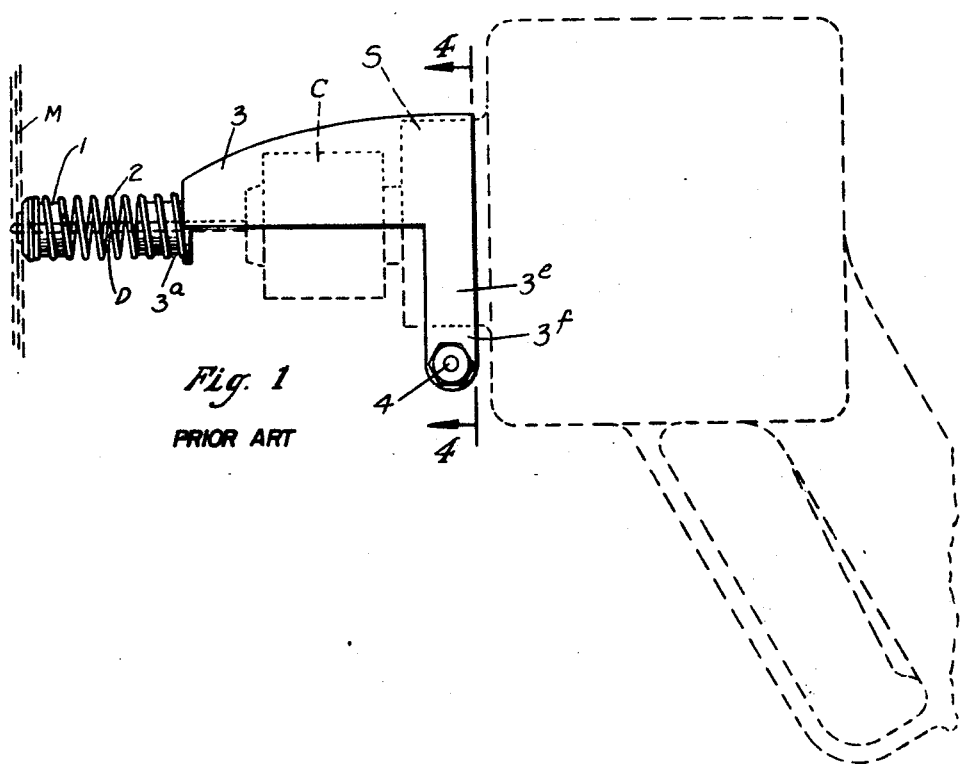
Figure 2:
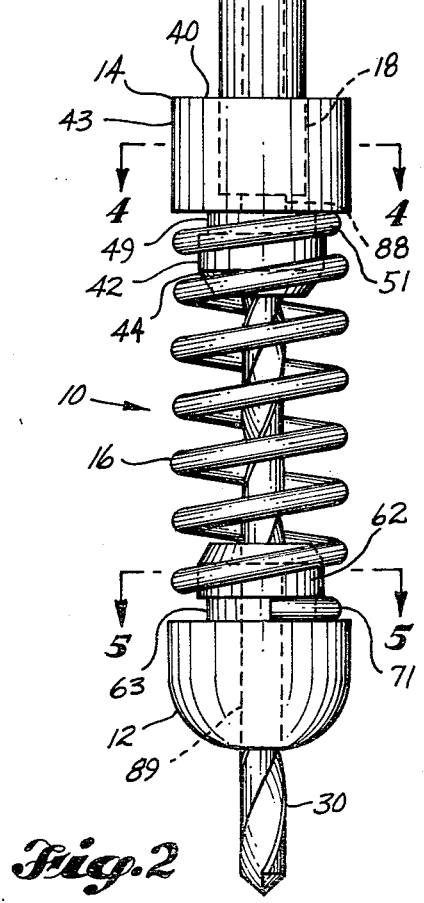
FIG. 2 is an elevational view showing a hand drill equipped with the present drill stop.
Figure 3:
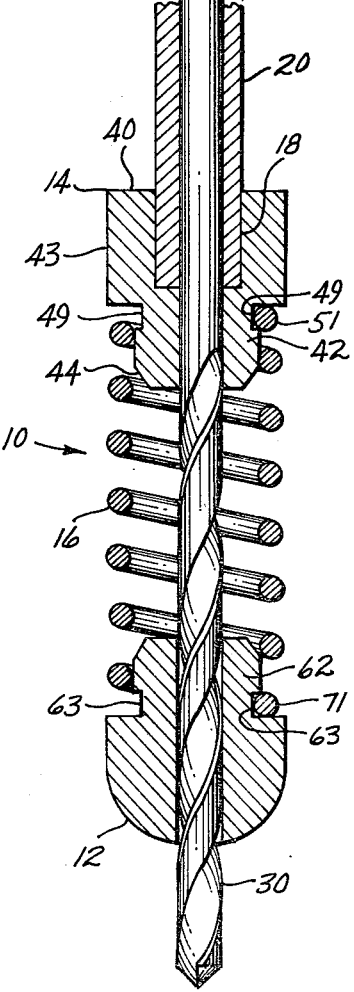
FIG. 3 is a sectional view of the drill stop and drill shown in FIG. 2.

Turning now to FIG. 1, it can be seen that the present drill stop 10 includes a conically shaped nosepiece 12 and cylindrically shaped bushing sleeve 14 with helical spring 16 retained therebetween while bushing sleeve 14 retains a first end 18 of cylindrically shaped tubular member 20 in press fit relationship, the other end 22 of cylindrically shaped tubular member 20 being in contact with chuck jaws 24 of drill chuck 26. Conically shaped nosepiece 12, cylindrically shaped bushing sleeve 14, helical spring 16, and cylindrically shaped tubular member 20 are all seen coaxially disposed about drill 30, having shank end 32 clamped within chuck jaws 24 of drill chuck 26.

Figure 4:
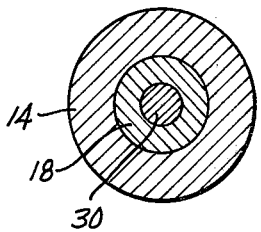
FIG. 4 is a cross-sectional view taken on line 4—4 of FIG. 2.
Figure 5:
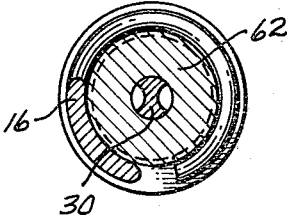
FIG. 5 is a cross-sectional view taken on line 5—5 of FIG. 2.

Now, in more detail, from observation of the present drill stop 10 viewed also in the sectional views of FIGS. 4 and 5, it can be seen that first end 18 of cylindrically shaped tubular member 20 is press fitted into a first end 40 of cylindrically shaped bushing sleeve 14, while the opposite end of cylindrically shaped bushing sleeve 14 comprises a cylindrically shaped protuberance 42. Portion 43 adjacent first end 40 has an outside diameter which is larger than the inside diameter of helical spring 16. The outside diameter of cylindrically shaped protuberance 42 at end 44 opposite portion 43 is also greater than the inside diameter of steel helical spring 16 while circumferentially disposed circular cross section groove 49 of protuberance 42 intermediate portion 43 and end 44 has a diameter around the bottom surface thereof equal to about the inner diameter of helical spring 16, thereby providing seating of a portion of first turn 51 of steel helical spring 16. Conically shaped nosepiece 12 similarly includes a cylindrically shaped protuberance 62. Cylindrically shaped protuberance 62 includes a circumferentially disposed groove 63 corresponding to portion 49 of cylindrically shaped protuberance 42, thereby providing seating of a portion of the last turn 71 of helical spring 16. Since there is no transition angle to follow the inner diameter of helical spring 16 out of either circumferentially disposed groove 49 or 63 along the outer surface of cylindrically shaped protuberances 42 or 62, there is no biasing of ends 51 or 71 of helical spring 16 to retain helical spring 16 in perfect coaxial alignment with cylindrically shaped bushing sleeve 14 and conically shaped nosepiece 12, and therefore helical spring 16 is retained slightly skewed with respect to the center axis of drill 30. Stainless steel cylindrically shaped tubular member 20 has an inside diameter providing a slip fit or larger with respect to the outside diameter of drill 30, while the overall length thereof is determined by the length of drill 30 minus drill tip exposure from conically shaped nosepiece 12 when drill 30 is chucked on 66 percent of jaw 24 surface length. Hole 89 and hole 88 in conically shaped nosepiece 12 and cylindrically shaped bushing sleeve 14, respectively, complement drill 30 diameter by providing split fits with respect thereto. In passing it can be further observed that adjustment of drill 30 in chuck 26 by the operator can permit variable drill point exposure.

The following observations can be made with respect to the structure and functions of the present drill stop 10 when compared to the prior art drill bushing device shown in FIG. 1;

In the FIG. 1 drill bushing devices, the spring cushions the shock of drill breakthrough. The spring functions as a holder of bushing 1 in the drill template, at drill breakthrough bushing 1 contacts lug 3a as a positive stop. When drilling holes for a full shift, the mechanic tends to complain of elbow fatigue if the drill stop is positive.

The present drill stop 10 indexes on drill 30 with end 22 of cylindrically shaped tubular member 20 contacting chuck jaws 24 and can be removed instantly for drill changes, whereas the drill bushing device tends to make drill changes difficult with limited access to drill chuck opening.

The present drill stop 10 can be easily changed by the operator to accommodate any length drill by press fitting a new length cylindrically shaped tubular member 20 into cylindrically shaped bushing sleeve 14, whereas the aforementioned drill bushing device of FIG. 1 has no provisions for variable length drills.

Drill stop 10 can be utilized to drill from pilot hole locations or felt marking pen marks and can also be used to drill through a drill plate if the holes are so marked, whereas the aforementioned drill bushing device is limited to drill plate drilling only because the drill point is hidden from operator view.

Drill stop 10 provides excellent visibility of drill point.

The drill bushing device of FIG. 1 is not directed to drill stop function and has a very flexible spring, e.g., spring contact of less than about 10 pounds per inch to provide required flexibility to allow drill penetration through a thick stack, while the present helical spring 16 has a spring constant greater than about 10 pounds per inch, viz., made stiffer, and of about 29 pounds per inch for #40, #30, #20, #10 drills and on larger drill sizes, i.e., 7/32, ⅛, #F, and 9/32, a spring constant of about 38 pounds per inch.

The boss on the end of the bushing of FIG. 1 locates the drill with respect to a template or tooling hole and the function of the spring is to hold the locator beyond the end of the drill so that the drill does not prevent the boss from entering the hole while present helical spring 16 is as hereinbefore mentioned very stiff to limit drill travel.

I claim:

1. A drill stop capable of telescoping over a drill having the shank position thereof disposed between drill chuck jaws, said drill stop comprising:

a conically shaped nosepiece facing the drilling surface, said nosepiece having a hole coaxially disposed therein providing a slip fit with the drill diameter;

a cylindrically shaped bushing sleeve coaxially disposed about the drill, said cylindrically shaped bushing sleeve disposed along the axis of the drill between said conically shaped nosepiece and the drill chuck jaws;

a cylindrically shaped tubular member coaxially disposed about the drill, said cylindrically shaped tubular member disposed along the axis of the drill between said cylindrically shaped bushing sleeve and the drill chuck jaws;

said cylindrically shaped bushing sleeve having a first end for receiving a first end of said cylindrically shaped tubular member in press fit relationship therewith, said cylindrically shaped bushing sleeve having a cylindrically shaped protuberance extending coaxially from the other end thereof opposite said first end;

said conically shaped nosepiece having a cylindrically shaped protuberance extending coaxially from the end thereof opposite the end facing said drilling surface; and, a helical spring disposed along the axis of the drill between said conically shaped nosepiece and said cylindrically shaped bushing sleeve, said helical spring having a first end seated in a groove in said cylindrically shaped protuberance of said conically shaped nosepiece and a second end seated in a further groove in said cylindrically shaped protuberance of said cylindrically shaped bushing sleeve.

2. The invention according to claim 1 said helical spring is skewed with respect to the center axis of the drill.

3. The invention according to claim 1 wherein the spring constant of said helical spring is greater than about 10 pounds per inch.

4. The invention according to claim 1 wherein the spring constant of said helical spring is about 29 pounds per inch.

5. The invention according to claim 1 wherein the spring constant of said helical spring is about 38 pounds per inch.

* * * * *